United States Patent [19]

Sprague

[11] 4,037,013

[45] July 19, 1977

[54] CARPET UNDERLAY COMPRISING FOAMED SCRAP PARTICLES

[75] Inventor: George R. Sprague, Dyersburg, Tenn.

[73] Assignee: Dayco Corporation, Dayton, Ohio

[21] Appl. No.: 629,745

[22] Filed: Nov. 7, 1975

[51] Int. Cl.² ............................ B32B 5/24; B32B 5/30
[52] U.S. Cl. ............................... 428/310; 264/321; 428/306; 428/315; 428/327
[58] Field of Search ............... 428/315, 310, 305, 306, 428/85, 95, 96, 304, 327; 264/321

[56] References Cited

U.S. PATENT DOCUMENTS

| | | | |
|---|---|---|---|
| 2,878,153 | 3/1959 | Hacklander | 428/315 |
| 3,213,071 | 10/1965 | Campbell | 428/315 |
| 3,256,133 | 6/1966 | Wright et al. | 428/315 |
| 3,531,367 | 9/1970 | Karsten | 428/315 |
| 3,567,536 | 3/1971 | Wickersham, Jr. | 428/315 |
| 3,616,029 | 10/1971 | Lerman | 428/315 |
| 3,746,610 | 7/1973 | Hoegger | 428/315 |
| 3,780,731 | 12/1973 | Quello | 428/483 |

FOREIGN PATENT DOCUMENTS

| | | | |
|---|---|---|---|
| 936,921 | 9/1963 | United Kingdom | 428/310 |

*Primary Examiner*—William J. Van Balen
*Attorney, Agent, or Firm*—Reuben Wolk

[57] ABSTRACT

A carpet underlay and method of making same are provided wherein the carpet underlay comprises a layer of bonded scrap particles of flexible elastomeric foam and at lest another layer bonded against the layer of bonded scrap particles free of additional adhesive means between layers.

1 Claim, 8 Drawing Figures

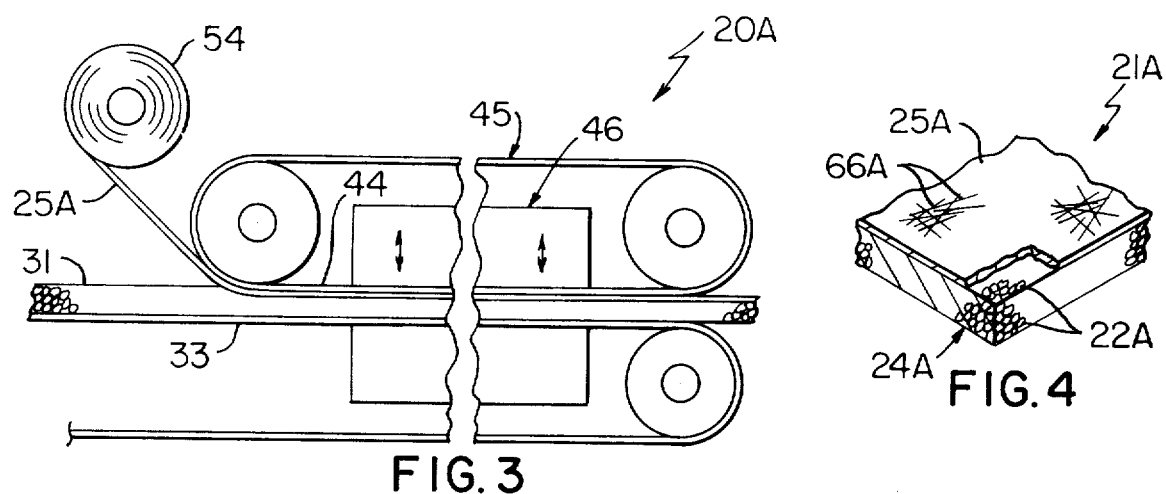
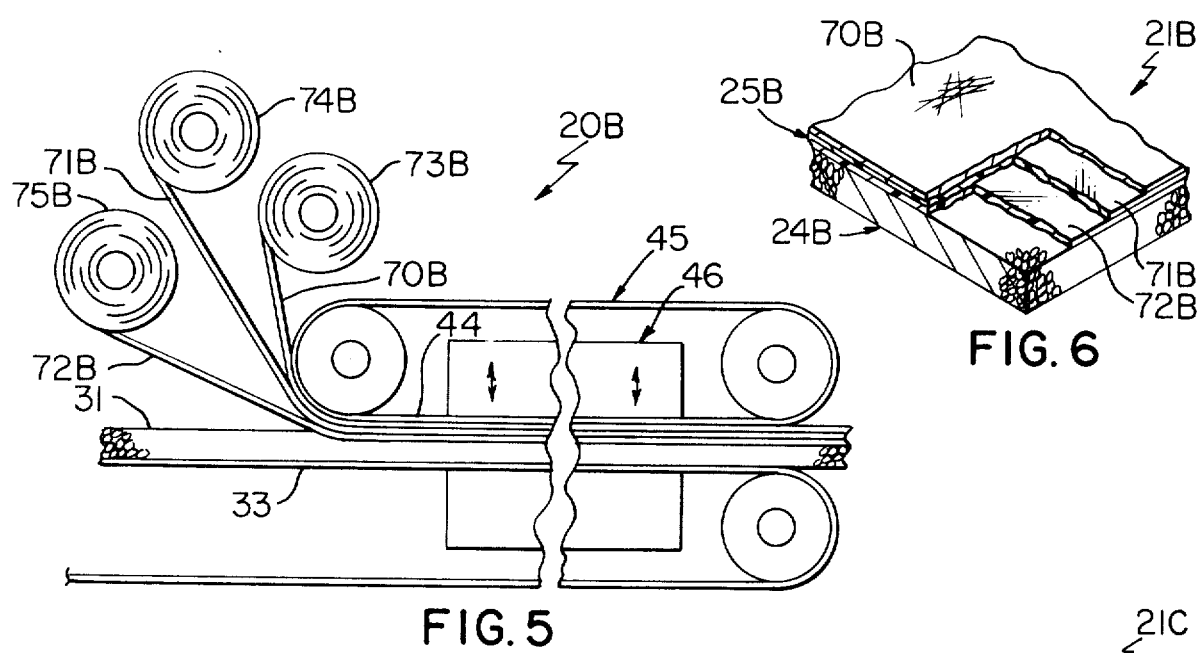
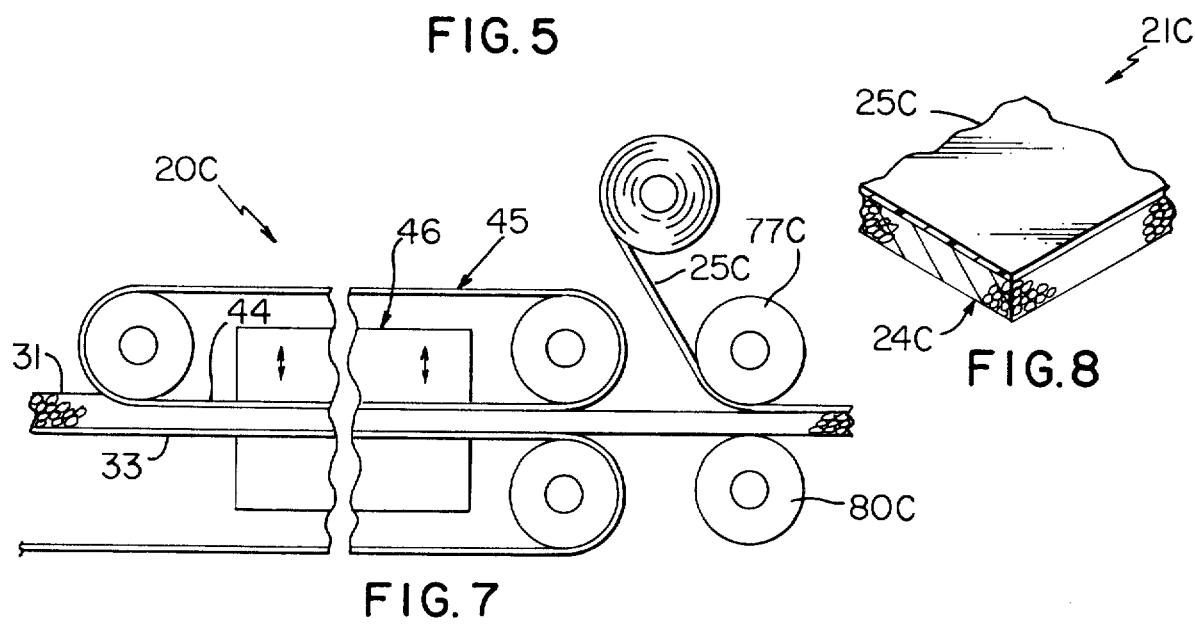

CARPET UNDERLAY COMPRISING FOAMED SCRAP PARTICLES

BACKGROUND OF THE INVENTION

The manufacture and sale of carpet underlay is a highly competitive industry in which constant efforts are being made to reduce the costs of carpet underlays being manufactured while providing a carpet underlay of satisfactory quality. Basically, it has been found that the use of any material which is less expensive than the usual materials employed while having the desired structural characteristics or the use of any process which is comparatively more simple than the commonly used processes or which employs commerically available equipment will give the manufacturer a marketing advantage.

SUMMARY

It is a feature of this invention to provide an economical carpet underlay which utilizes at least one layer of bonded scrap particles of flexible elastomeric foam yet with such underlay having optimum structural integrity.

Another feature of this invention is the provision of an inexpensive carpet underlay of the character mentioned which may be made utilizing comparatively inexpensive commercially available equipment.

Another feature of this invention is the provision of a carpet underlay which is particularly adapted to be used as a temporary inexpensive carpet as well as an underlay or padding for a more expensive carpet.

Another feature of this invention is to provide a method of continuously making carpet underlay using scrap flexible elastomeric foam material to define a continuous layer of bonded scrap particles and continuously laminating at least another layer against the layer of bonded scrap particles.

Accordingly, it is an object of this invention to provide carpet underlay and method of making same having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 3 is a fragmentary view showing only the downstream part of the apparatus and method of FIG. 1 (the upstream part being identical to FIG. 1) utilized to define another exemplary embodiment of a carpet underlay of this invention;

FIG. 4 is a view similar to FIG. 2 illustrating carpet underlay defined as shown in FIG. 3;

FIG. 5 is a view similar to FIG. 3 illustrating the downstream portion of the apparatus and method steps of FIG. 1 as modified to define another exemplary embodiment of the carpet underlay of this invention;

FIG. 6 is a view similar to FIG. 2 illustrating carpet underlay defined as shown in FIG. 5;

FIG. 7 is a fragmentary view of the downstream portion of the apparatus and method steps of FIG. 1 wherein additional components and steps are used to define another exemplary embodiment of the carpet underlay of this invention; and FIG. 8 is a view similar to FIG. 2 illustrating carpet underlay defined as shown in FIG. 7.

DESCRIPTION OF ILLUSTRATED EMBODIMENTS

Figure 2:
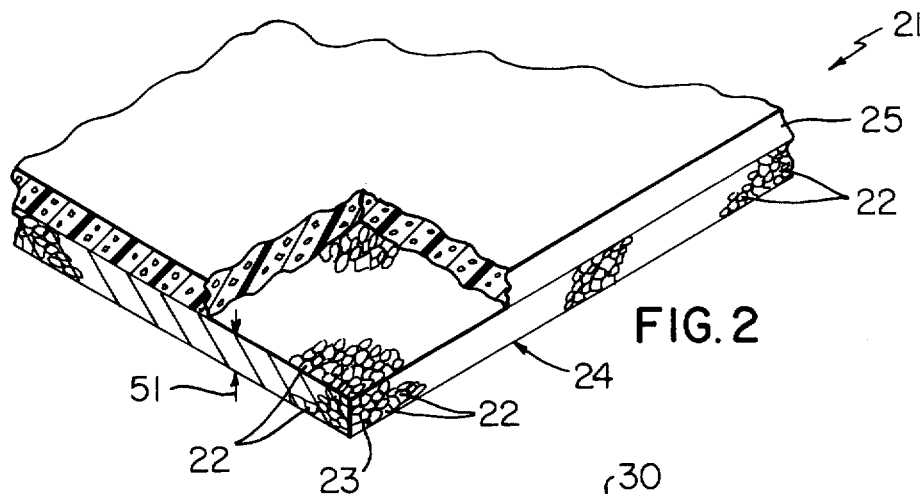
FIG. 2 is a fragmentary view with parts in cross section, parts in elevation, and parts broken away illustrating one example of the carpet underlay of this invention madeutilizing the method illustrated in FIG. 1.
Figure 1:
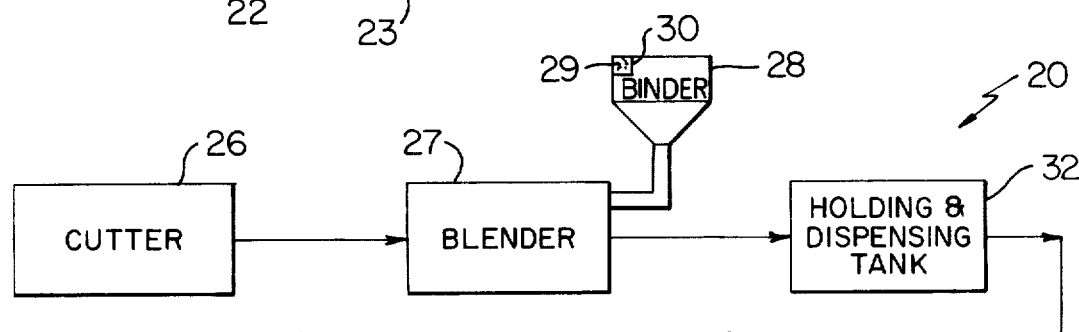
FIG. 1 is a schematic view in elevation illustrating a typical apparatus and an exemplary method of this invention which may be employed to make one exemplary embodiment of a carpet underlay comprised of a continuous layer of bonded scrap particles of flexible elastomeric foam and another layer bonded against the layer of bonded scrap particles.
Figure 1:
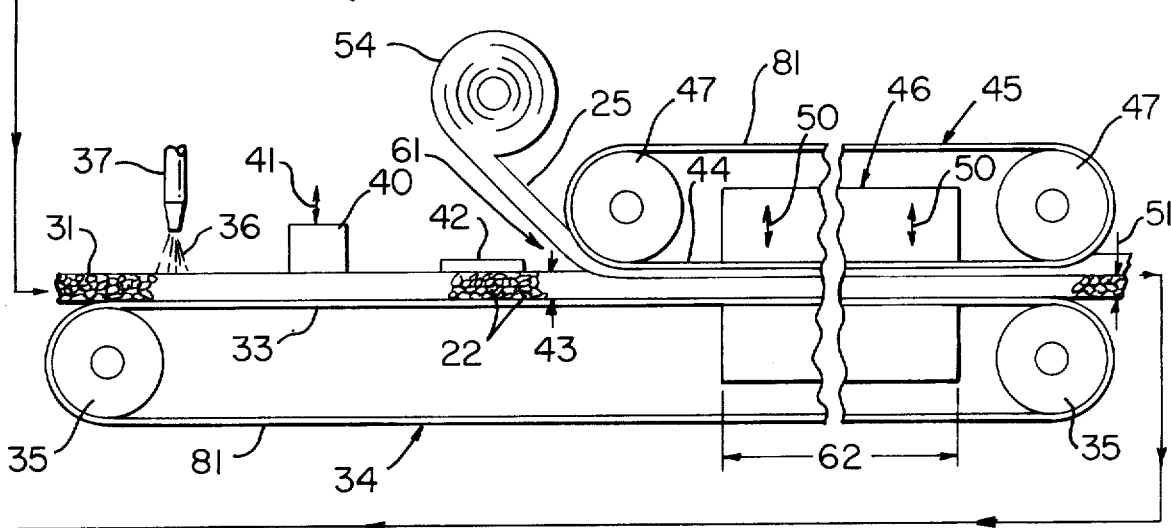

Reference is now made to FIG. 1 of the drawings which illustrates an exemplary apparatus which may be employed to practice the method of this invention and define one exemplary embodiment of the improved carpet underlay of this invention and such apparatus and method will be designated generally by the reference numeral 20 and the embodiment of the carpet underlay defined thereby is illustrated in FIG. 2 and desingated by the general reference numeral 21.

The carpet underlay 21 is comprised of a layer of bonded scrap particles of soft flexible elastomeric foam which may be in the form of urethane foam and a respresentativefew of such particles are designated by the reference numeral 22 in FIG. 2. The particles 22 are suitably bonded together by a binder 23 disposed between such particles and the bonding action is achieved in accordance with the method of this invention to define a layer 24 of bonded scrap particles and as will be described in detail subsequently.

Thecarpet underlay 21 of this example has another layer 25 which is bonded against the layer 24 and the layer 25 is a sheet of soft flexible prime urethane foam and is bonded against the layer 24 free of additional adhesive means or additionally applied adhesives between the layers 24 and 25.

The carpet underlay 21 is preferably made utilizing the method 20 illustrated in FIG. 1 and in the practice of such method, scrap flexible elastomeric foam material is cut into particles having a desired size range by suitable cutting means which may be in the form of one or more suitable cutting devices and as illustrating schematically by a block 26 which is also labelled cutter. The size range of the particles of the scrap will vary depending upon the flexible elastomeric foam material employed and the desired characteristics of the carpet underlay and in the case of the underlay 21 where urethane foam material is used each of the particles has a size generally of the order of three-eighths of an inch the largest dimension thereof.

The particles 22 are then suitably transferred to a blender which is also designated by the reference numeral 27 and when the blender 27 is filled with the desired amount of scrap particles 22 a predetermined amount of the binder 23 is introduced into the blender 27. The binder may be in liquid form and may be conveyed in a metered quantity from a tank 28 thereof into the blender 27 by gravity, pumping action, or other suitable technique.

At the time of introducing the binder 23 from the tank 28 into the blender 27 a suitable coloring for the particles 22 may be provided and simultaneously introduced in the desired amount into the blender 27. The coloring may be in any suitable form and in this example is in the form of dry color pigments 29 carried in a container 30 mounted adjacent the top of the tank 28.

Once the desired amounts of particles 22 and binder 23 together with the desired color pigments 29 have been introduced in the blender 27, such blender is operated for a predetermined time interval to define a mixture 31 thereof. The mixture 31 is conveyed from the blender 27 using any suitable known conveying means (not shown) to a suitable holding and dispensing tank 32.

The mixture 31 is, in essence, temporarily stored in the tank 32 and is removed from such tank and deposited using any suitable depositing apparatus or device (not shown) on the top flight 33 of an endless belt conveyor which is designated generally by the reference numeral 34. The endless belt conveyor 34 is operated around oppositely arranged rollers 35 and the conveyor 34 is made of a material such as glass fibers, for example, which make the conveyor capable of withstanding elevated temperatures and for a purpose to be described subsequently.

The mixture 31 is deposited on the top flight 33 of conveyor 34 in a continuous uninterrupted process to enable forming of the layer 24 in a continuous operation. As the mixture 31 drops onto the top flight 33 of the conveyor 34 water which is designated by the reference numeral 36 is introduced into the mixture 31 and such water is preferably introduced using a water spray nozzle 37 which introduces water into the mixture as a fine spray thereof. The purpose of the water 36 will be described subsequently.

The thickness of the mixture 31 on the preferably horizontally arranged top flight 33 of the belt conveyor 34 is controlled by two devices one of which will be referred to as a dam 40 which is movable upwardly and downwardly by suitable moving mechanism which is designated schematically by a double arrow 41 and the other of which is a horizontally oscillating screed device or screed 42. The position of the dam 40 determines a basic thickness of the water sprayed mixture 31 that is allowed to be moved by the belt conveyor 34 and such mixture is further leveled to a reasonably uniform height or thickness by the screed 42. The screed 42 is of known construction and is operated in accordance with known techniques.

The levelled mixture of reasonably uniform thickness 43 is moved beneath the bottom flight 44 of another endless belt conveyor 45 so that the mixture 31 is disposed between the bottom flight 44 of the belt conveyor 45 and the top flight 33 of the belt conveyor 34; and, the belt conveyor 45 also has a pair of oppositely arranged supporting rollers 47 and such belt 45 is also preferably made of a suitable material such as flass fibers or the like.

The method 20 also employs a compacting and curing device which is designated by the general reference numeral 46, and the device 46 is adapted to receive the controlled thickness mixture 31 therethrough as it is moved by the belts 34 and 45. The device 46 serves to compact the mixture 31 while subjecting such mixture to a controlled heat as the mixture 31 is moved therethrough by the belts 34 and 45. Further, with the belts 34 and 45 being made of glass fibers they are not detrimentally effected by the heat acting on the material 31.

The compacting and curing device 46 is verticallyadjustable by suitable means indicated schematically by double arrows 50; and, as the uncompressed mixture having the thickness indicated at 43 is moved through the compacting and curing device 46 heat therefrom serves to start the catalytic action of the water 36 in the mixture causing the binder 23 to bind the particles 22 and define the continuous layer 24 which has a thickness illustrated at 51 in FIGS. 1 and 2 and such thickness is substantially less than the controlled thickness 43 of the mixture 31 prior to introduction thereof in device 46 whereby layer 24 of bonded particles 22 has a comparatively higher density than the loose material or mixture 31.

The conveyors 34 and 45 may be operated in a cooperating manner to define layer 24 alone and in such a situation, note that the bottom surface of the bottom flight 44 of conveyor 45 would be urged against the top surface of the mixture; however, in this example of the invention, another layer is preferably continuously bonded or laminated against the layer 24 of bonded scrap particles 22 simultaneously with the forming of layer 24. In particular a layer in the form of a sheet 25 of flexible prime urethane foam is introduced between the thickness 43 of the mixture 31 and the bottom flight 44 of the endless belt conveyor 45. The layer or sheet 25 is provided on a supply roll 54 thereof which is suitably supported for unwinding rotation; and, as the belt conveyors 34 and 45 move the controlled thickness mixture 31 through the compacting and curing device 46 the layer 25 is urged and held against the top surface of the mixture to provide continuous lamination of layer 25 against the layer 24 of scrap particles simultaneously with the forming of layer 24 by the action of the binder 23 being heated and cured under the catalytic influence of the water 36.

Thus, the thickness 43 of mixture 31 is compacted to the desired density in the compacting and curing device 46 and the particles 22 bonded together as a unitary structure to define layer 24 while layer 25 is simultaneously bonded against the layer 24 in a continuous uninterrupted process to define the carpet underlay 21 of FIG. 2. The underlay has an even thickness and an equal cross-section throughout as shown in FIG. 2. The laminated layers 24 and 25 defining the underlay 21 are suitably air cooled and wound as shown at 57 to define a supply roll 60 thereof.

The action of the device 46 is to compact the comparatively loose mixture 31 of particles 22 and continuously bond and cure such mixture to define the layer 24; however, inasmuch as the sheet 25 is a completed sheet with its own structural integrity the device 46 merely serves to heat and compress the sheet 25 as shown at 61 without effecting its structural characteristics and once relieved from the compressing action of the compacting and curing device 46 the sheet 25 will return to its expanded original thickness as is the characteristic of soft flexible urethane foam.

The compacting and curing device 46 has a length designated by the reference numeral 62 and depending on such length the speed of the cooperating belt conveyors 34 and 45 is controlled to establish the length of time that the mixture 31 and the layer 24 are subjected to compacting pressures and elevated temperatures to achieve bonding of the particles 22 and layer 25 thereagainst and curing of the binder. In the case of carpet underlay 21 wherein particles 22 of soft flexible urethane foam and used and sheet 25 is a sheet of soft flexible prime urethane foam the belt speed are controlled to provide an exposure time of about 4 minutes in the device 46 at a temperature ranging between 300° F and 320° F.

Other exemplary embodiments of the carpet underlay of this invention and method of making same are illustrated in FIGS. 3-4, 5-6, and 7-8. The carpet underlay illustrated in each of these FIGS. is very similar to the carpet underlay 21; therefore, the carpet underlay of FIGS. 3-4, 5-6, and 7-8 will be designated by reference numerals 21A, 21B, and 21C respectively and parts of each carpet underlay 21A, 21B, and 21C which are similar to corresponding parts of the carpet underlay 21 will be designated by the same reference numeral as in the carpet underlay 21 followed by the associated letter designation either A, B, or C and not described in detail. Only those component parts of each carpet underlay which are different from corresponding parts of the carpet underlay 21 will be designated by a new reference numeral also followed by the associated letter designation and described in detail.

Each of the carpet underlays 21A, 21B, and 21C is preferably made using the same basic method steps as the steps employed to make the carpet underlay 21 especially insofar as the provision and bonding of particles of scrap flexible elastomeric foam material to define the layer of bonded scrap particles of soft flexible elastomeric foam whether such layer comprises 24A of underlay 21A, 24B of underlay 21B, or 24C of underlay 21C.

The main difference between the carpet underlay 21A, shown in FIG. 4, and the carpet underlay 21 is that the carpet underlay 21A instead of having a sheet of flexible prime urethane foam bonded against its layer of bonded particles has a layer 25A which is in the form of a sheet of spunbonded polyester fibers which is designated by the reference numeral 25A bonded against its layer 24A. The fibers 66A of sheet 25A are continuous filament fibers which are randomly arranged, highly dispersed and bonded at their filament junctions. The fibers 66A may be in the form of crimped fibers whereby the sheet 25A has a more pliable character or such fibers may be substantially straight or rectilinear whereby the sheet 25A would have a controlled stiffness.

Although any suitable synthetic thermoplastic fibrous material may be used to define sheet 25A, such sheet is preferably made of spunbonded polyester fibers and exceptionally good results have been obtained using a spunbonded polyester material manufactured by the Textile Fibers Department, E.I. DuPont De Nemours and Company, Inc. of Wilmington, DE. 19898, and sold under the trademark of REEMAY.

As seen in FIG. 3 of the drawings, the sheet 25A is suitably supported for unwinding rotation on a supply roll 54 thereof and moved into the device 46 in a similar manner as disclosed in connection with the sheet 25 of the carpet underlay 21. Accordingly, the sheet 25A is introduced between the top surface of the mixture 31 and the bottom flight 44 of the endless belt conveyor 45 and the belt conveyors 34 an 45 cooperate to move their respective top flight 33 and bottom flight 44 through the compacting and curing device 46 with the mixture 31 and sheet 25A sandwiched therebetween to provide continuous lamination of the layer 25A against the layer 24A of bonded scrap particles 22A formed from mixture 31 as such layer 24A is continuously formed.

The carpet underlay 21B of FIG. 6 has a layer which is designated generally by the reference numeral 25B bonded against the layer 24B in a similar manner as layer 25 is bonded to layer 24. The layer 25B is comprised of a plurality of three integrally bonded sheets consisting of an outer facing sheet 70B of spunbonded polyester fibers and a pair of sheets of polyethylene film 71B and 72B disposed beneath the outer sheet 70B; and, the inner sheet 72B is bonded to layer 24B to define the unitary laminated structure or underlay 21B.

As seen in FIG. 5, the sheets 70B, 71B, and 72B defining the layer 25B are provided from associated supply rolls 73B, 74B, and 75B respectively and supported for unwinding rotation so as to enable introduction thereof between the top surface of the mixture 31 of particles which define layer 24B and the bottom flight 44 of the belt conveyor 45 and in a similar manner as described for the formation of the carpet underlay 21. As the mixture of particles and three sheets 70B, 71B, and 72B move through device 46, such particles are simultaneously bonded together to define sheet 24B and the three sheets are bonded together and to the newly formed sheet 24B also simultaneously with the formation of sheet 24B - all resulting in the underlay 21B being made in a continuous uninterrupted process.

The carpet underlay 21C of FIG. 8 is defined by compacting and curing a predetermined thickness of a mixture 31 of particles and binder in the compacting and curing device 46 as illustrated in FIG. 7 with the bottom flight 44 of the belt conveyor 45 engaging the top surface of the mixture 31 as it enters such compacting and curing device. Subsequent to this compacting and curing operation and thus downstream of the device 46 yet in a continuous manner with the continuous forming of layer 24C, a top layer or sheet 25C may be bonded in position against layer 24C. The top layer 25C is continuously bonded in position using the residual heat still present in the layer 24C as it exits the hot compacting and curing device 46 as well as a heated pressure roll 77C and a cooperating backup roll 80C. The layer 25C is bonded to layer 24C free of additional adhesive means between the layers 24C and 25C whereby the bonding of these two layers is achieved solely by heat fusing action to define the carpet underlay 21C.

The layer of sheet 25C may be made of any suitable thermoplastic material known in the art and polyethylene has been used successfully to define sheet 25C and underlay 21C.

As previously mentioned, the endless belt conveyors 34 and 45 have been described as being made of glass fibers; however, it will be appreciated that such belts are made primarily of glass fibers which have been suitably bonded together in accordance with techniques which are well known in the art. Further, the belts 34 and 45 may be made of other materials such as metal, or the like. However, regardless of the material used to make belts 34 and 45, each belt is constructed such that it can operate through the compacting and curing device without detriment thereto by heat and/or pressure.

It will be appreciated that the particle engaging and sheet or layer engaging surfaces of the belt conveyors 34 and 45 may also be coated with suitable coating means designated by the reference numeral 81 in FIG. 1. To prevent the associated belt surface from sticking or adhering to the material or layer coming into contact therewith, exceptionally good results have been obtained when a coating of a fluorocarbon resin was used for this purpose. FEP an TFE fluorocarbon resins sold by the E. I. DuPont de Nemours Company, Inc. of Wilmington, DE., and sold under the trademark of TEFLON are examples of resins which have been used suscessfully.

Various devices have been illustrated and described in this disclosure without showing detailed structual supports, power sources, actuating devices, motion producing and control devices, temperature control devices, and the like. However, it will be appreciated that any suitable means or device known in the art may be employed to accomplish the desired well known functions.

The device 46 has been described as a compacting and curing device; however, it is to be understood that such compacting and curing device may comprise any well known part of a commerically available device such as a standard curing press, for example, which has platens which are heated in a controlled manner and positioned a controlled distance apart to exert a desired pressure all in accordance with techniques which are well known in the art.

In this disclosure of the invention, the detailed description has proceeded with the bonding of scrap particles of flexible elastomeric foam material in the form of urethane foam. However, it will be appreciated that other flexible elastomeric foam materials may be employed to define layers such as layers 24, 24A, 24B, and 24C and such material may be natural or synthetic rubber materials or plastic materials.

It will be appreciated that in the making of each carpet underlay 21, 21A, 21B, an 21C, the mixture 31 of particles in each instance is uncompressed and is comparatively low density. To obtain a higher density, the mixture 31 is compressed in the device 46 and when such device is part of a press, this compression is accomplished by controlling the spacing between the platens of such press. For example, the mixture 31 might be 1½ pounds per cubic foot and to obtain a 4½ pound per cubic foot layer of bonded particles such as layer 24 the mixture would be compressed to one third its original height, i.e., an original height of 1½ would be compressed to a thick finished product.

While present exemplary embodiments of this invention, and methods of practicing the same, have been illustrated an described, it will be recognized that this invention may be otherwise variously embodied and practiced within the scope of the following claims.

What is claimed is:

1. A carpet underlay having an equal cross-section throughout and consisting of first and second layers, said first lyer comprising bonded scrap particles of flexible elastomeric foam material, said second layer bonded against the entire surface of said first layer free of additional adhesive means between layers, said second layer being defined by a plurality of sheets consisting of a sheet of spunbonded polyester fibers and at least one sheet of polyethylene film, said sheet of polyethylene film disposed adjacent said first layer.

* * * * *